United States Patent [19]

Serafini

[11] Patent Number: 4,587,581
[45] Date of Patent: May 6, 1986

[54] MAGNETIC TAPE TRACKING CONTROL APPARATUS

[75] Inventor: Joseph J. Serafini, LaVerne, Calif.

[73] Assignee: Datatape, Inc., Pasadena, Calif.

[21] Appl. No.: 689,406

[22] Filed: Jan. 7, 1985

[51] Int. Cl.$^4$ .............................................. G11B 5/56
[52] U.S. Cl. ............................................................ 360/77
[58] Field of Search ............................................. 360/77

[56] References Cited

U.S. PATENT DOCUMENTS

| | | | |
|---|---|---|---|
| 3,549,797 | 12/1970 | Dann | 178/6.6 |
| 3,838,453 | 9/1974 | Buslik et al. | 360/70 |
| 4,044,388 | 8/1977 | Metzger | 360/70 |
| 4,056,832 | 11/1977 | Boer | 360/77 |
| 4,120,008 | 10/1978 | Metzger | 360/70 |
| 4,152,734 | 5/1979 | Louth | 360/70 |
| 4,184,181 | 1/1980 | Mijatovic | 360/77 |
| 4,297,731 | 10/1981 | Melwisch et al. | 360/70 |
| 4,347,534 | 8/1982 | Kimura | 360/77 |
| 4,364,097 | 12/1982 | Boer et al. | 360/70 |
| 4,402,023 | 8/1983 | Hiraguri | 360/77 |
| 4,433,350 | 2/1984 | Tsuruta | 360/70 |
| 4,462,053 | 7/1984 | Lum et al. | 360/78 |
| 4,486,792 | 12/1984 | Edakubo et al. | 360/10.2 |

FOREIGN PATENT DOCUMENTS

| | | | |
|---|---|---|---|
| 54-104311 | 8/1979 | Japan | 360/77 |
| 55-42319 | 3/1980 | Japan | 360/77 |
| 55-42372 | 3/1980 | Japan | 360/77 |
| 56-80822 | 2/1981 | Japan | 360/77 |

Primary Examiner—George G. Stellar
Attorney, Agent, or Firm—Dennis P. Monteith

[57] ABSTRACT

Tracking control apparatus for a magnetic storage device is provided for playback of information recorded on tracks at alternating azimuth angles which correspond to mutually different azimuth angles of a pair of magnetic playback heads. The playback heads have track-wise widths which are less than the width of their associated record tracks, to prevent the attenuation of their playback signals resulting from limited playback head tracking error. A tracking control head, which has an azimuth angle of one of the playback heads, is mounted for selectively overlapping adjacent record tracks in accordance with the magnitude and direction of the tracking error of the playback heads. Signal comparison circuitry produces a tracking error signal in accordance with the difference between the output of the control head and the output of a playback head. When the storage device is magnetic tape having information recorded on slant tracks, a tape drive servomechanism, responsive to the error signal, momentarily adjusts the speed of the tape, to align the playback heads with respect to their associated record tracks.

9 Claims, 10 Drawing Figures

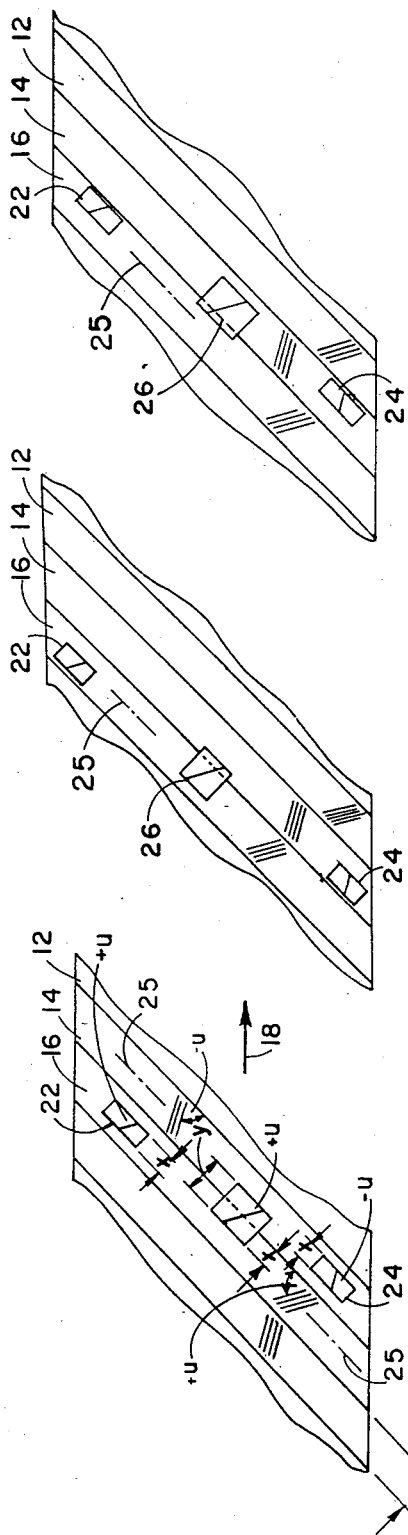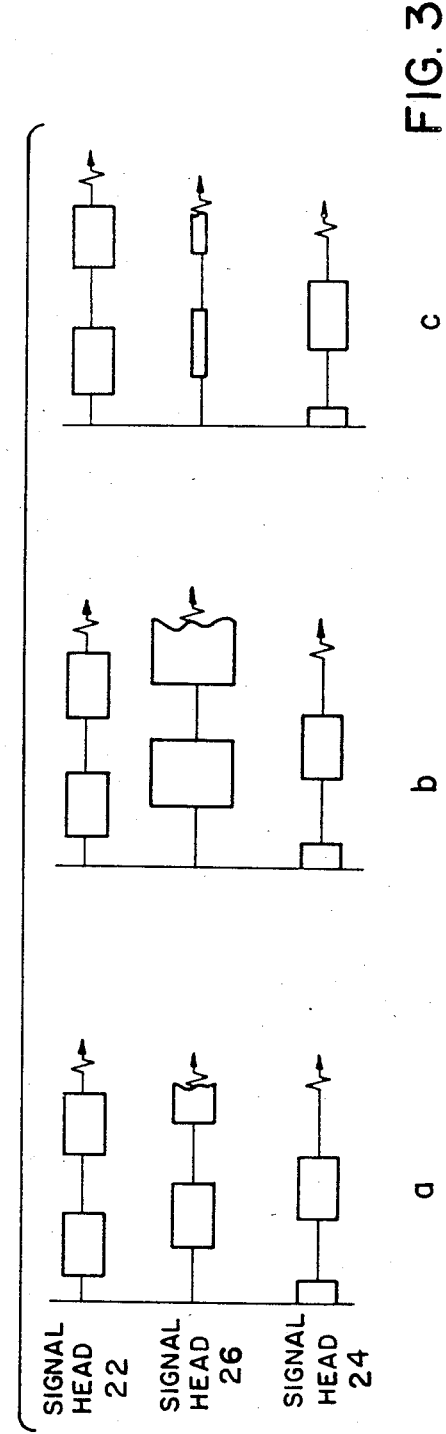

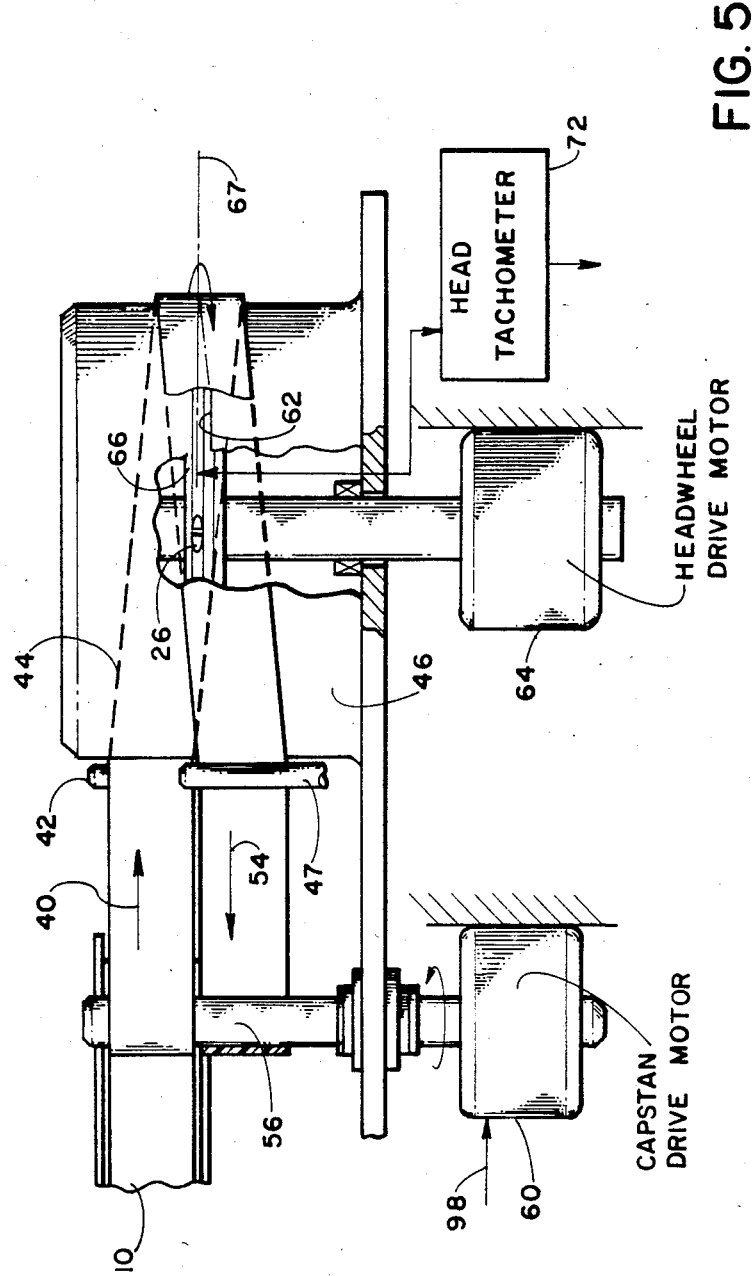

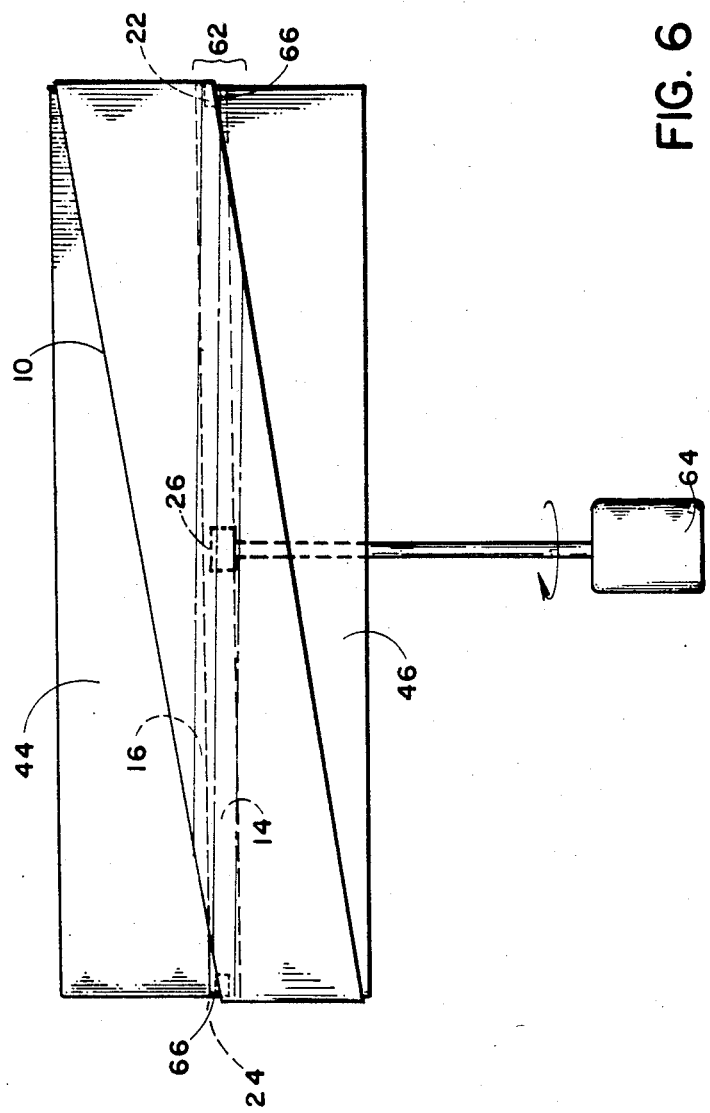

MAGNETIC TAPE TRACKING CONTROL APPARATUS

BACKGROUND OF THE INVENTION

1. Field of the Invention

The invention relates to magnetic playback apparatus. In particular, the invention relates to tracking control apparatus for aligning a playback head with a record track recorded on a magnetic storage device at an azimuth angle which is different from the azimuth angle of information recorded on adjacent record tracks.

2. Description Relative to the Prior Art

With reference to the magnetic recording art, tracking is the process of keeping a playback head on the path of a track already recorded on a magnetic storage device. The purpose of tracking control is to adjust the position of the playback head relative to the record track or vice versa, so that the playback head is aligned with the recorded track for maximum signal-to-noise output. Although tracking is a requirement of playback apparatus for a variety of magnetic storage devices, tracking control requirements are particularly stringent for slant track tape playback apparatus where a playback head sweeps transversely across a magnetic tape at high speed, as the tape is moving, and for a magnetic disk storage device, where a disk moves at high speed past a playback head.

When playback occurs on apparatus that is different than the apparatus that was used for recording, tracking control has been found to be even more necessary because of mechanical tolerance build-up inherent in different playback apparatus, variations of the scanning plane of the playback head, variations in storage device position, and other secondary tolerances. Tracking control has in the past often been an operator adjustment, particularly whenever playback occurred with apparatus different than the recorder apparatus.

Also known in the art are methods and apparatus for automatic tracking control. When recording signals in parallel tracks, cross talk from track to track can be kept to a minimum for increasing playback signal output if adjacent tracks are separated by a guard band. However, guard bands consume storage space that otherwise could be used for recording.

Even with guard bands, it is still necessary to provide for tracking control. For example, prior art U.S. Pat. Nos. 4,044,388 and 4,120,008 disclose tracking control apparatus for a video tape recorder in which a tracking control head is arranged to overlap adjacent slant tracks separated by a guard band, to sense horizontal synchronization pulses recorded on each track. The synchronization pulses on one track are prearranged with respect to the synchronization pulses on the adjacent track. Pulses on one track follow their corresponding pulses on the adjacent track by a predetermined distance, the length of which depends on whether or not the following pulse is from an odd-numbered or an even-numbered track. Circuitry connected to the tracking control head produces a track-alignment error signal which drives a tape drive capstan motor to control track alignment. The magnitude of the error is related to the respective playback amplitudes of corresponding synchronization pulses on adjacent tracks. The direction of the error is determined by the distance separating corresponding playback pulses.

It is also known in the art to record with azimuth angles of head gaps which are different from track to track, to minimize cross talk. With azimuth recording apparatus, guard bands can be eliminated. In some cases, adjacent tracks may actually overlap to some degree. Because track pitch is smaller with azimuth recording, the aligning of the record tracks with the playback heads is more critical.

U.S. Pat. Nos. 4,184,181 and 4,297,731 disclose azimuth recording of video signals in which playback tracking control apparatus includes a pair of playback heads having gaps positioned at azimuth angles corresponding respectively to alternating signal tracks. Circuitry, coupled to the heads, detects a phase difference between two consecutive horizontal synchronization pulses, each of which is associated with a respective one of two adjacent signal tracks. An error signal, relating to the magnitude and polarity of the phase difference, drives a headwheel motor to control track alignment.

In the aforementioned prior art, tracking control can be achieved automatically only so long as a predetermined signal has been recorded, for example, horizontal synchronization pulses of a video signal. Accordingly, such prior art suffers from a disadvantage in that its tracking control function only has application to the playback of signals in which there is a priori information regarding a component of the recorded signals.

SUMMARY OF THE INVENTION

In view of the foregoing, an object of the invention is to overcome the aforementioned limitation of the prior art and, in so doing, to provide for a magnetic storage device tracking control apparatus which is not limited to the tracking of predetermined signals. This object is achieved with tracking control apparatus for playback of record tracks recorded at alternating azimuth angles which correspond respectively to mutually different azimuth angles of corresponding playback heads.

In a preferred embodiment, a playback head has a track-wise width that is less than the width of its associated record tracks, to prevent the attenuating of its playback signal as the result of limited misalignment of the playback head relative to a reference line of its corresponding record track. A tracking control head, having a track-wise width that is wide relative to the track-wise width of the playback head, is mounted in fixed spatial relationship with respect to the playback head, wherein the control head (1) overlaps the record track associated with the playback head a predetermined amount when the playback head is aligned with respect to a reference line of its associated track, and (2) overlaps the track associated with the playback head a variable amount in accordance with the magnitude and the direction of misalignment of the playback head with respect to the reference line of its associated record track. The control head has an azimuth angle corresponding to the playback head and thereby produces a tracking control signal having an amplitude which is proportional to the amount which the control head overlaps the record track associated with the playback head. A comparator circuit produces a tracking error signal in accordance with the difference between the amplitude of the control signal and the amplitude of the playback signal from the playback head. A servomechanism, responsive to the tracking error signal, causes the alignment of the playback head with respect to its associated record track.

Because there are no restrictions regarding the content of the recorded signals, the tracking control apparatus of the invention has general application to azimuth recording and to precision playback of any of a variety of recorded signals, which is not the case with the aforementioned prior art. Furthermore, because the tracking control head has an azimuth angle corresponding to the azimuth angle of recorded information, when the control head has a track-wise width that is equal to the width of the record tracks, the control head may also serve as a record head when the apparatus used for playback is the same apparatus used for recording. These and other advantages of the invention will become more apparent in the detailed description of preferred embodiments presented below.

DESCRIPTION OF THE DRAWINGS

In the detailed description of preferred embodiments of the invention presented below, reference is made to the accompanying drawings, in which:

FIGS. 2a, 2b and 2c are diagrammatic illustrations of three tracking conditions relating to the playback of information recorded at alternating azimuth angles on adjacent magnetic tape record tracks;

FIG. 3 illustrates the envelopes of playback signals corresponding to the three tracking conditions of FIG. 2;

FIG. 5 is a side view of rotary transducer apparatus and tape transport apparatus for use with tracking control apparatus in accordance with a presently preferred embodiment of the invention;

FIG. 6 is a view of a headwheel illustrating temporal and spatial relationships between a tracking control head and a pair of tape playback heads;

DETAILED DESCRIPTION OF PREFERRED EMBODIMENTS

Figure 1:
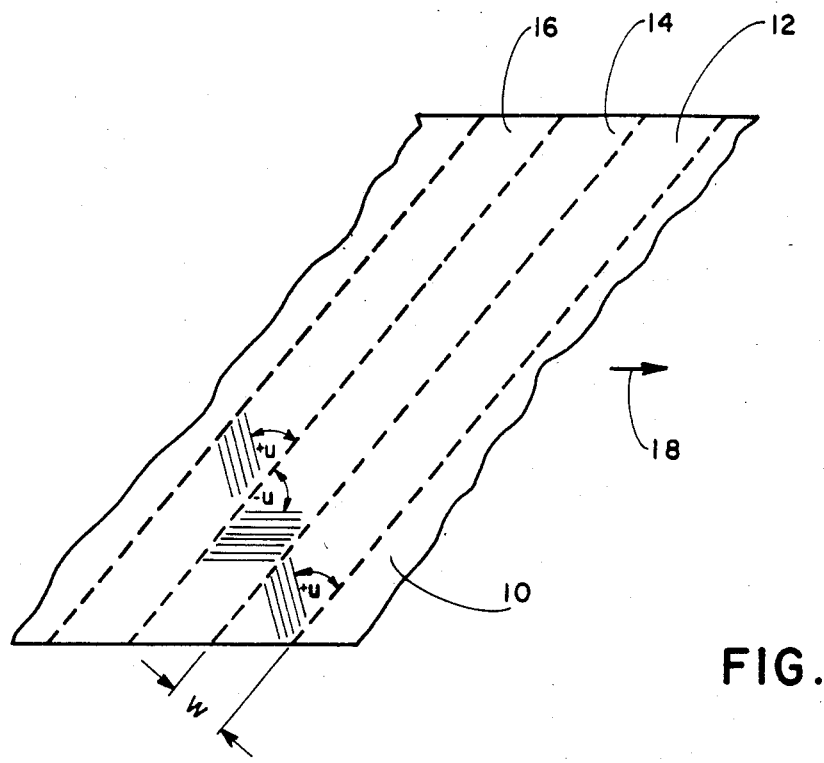
FIG. 1 is a diagrammatic illustration of three oblique magnetic tape record tracks with information on adjacent tracks recorded at mutually different azimuth angles.

FIG. 1 illustrates a magnetic storage device, such as a magnetic tape 10, having signals recorded thereon in oblique parallel tracks. In this figure three adjacent signal tracks 12, 14 and 16 follow each other in the direction of tape movement, denoted by the arrow 18. As illustrated by the phantom lines, adjacent edges of adjacent tracks coincide so that guard bands on the tape 10 are eliminated. It will be understood that this side-by-side arrangement of the record tracks of FIG. 1 is for illustration only. As made apparent hereinbelow, adjacent tracks may actually overlap to some degree, or may be separated by a guard band.

To limit cross talk between adjacent record tracks, alternating tracks have information recorded at mutually different azimuth angles. These different azimuth angles are illustrated in FIG. 1 in that recorded information is represented by groups of closely spaced parallel lines. The information on one track, i.e. track 12, is recorded with a record head, the gap of which is oriented in azimuth at an angle of +u and the next track, i.e. track 14, the information is recorded at an azimuth angle of −u, then on track 16 an angle of +u, etc.

The magnetic heads used in playback must, of course, also have gaps oriented in azimuth corresponding to the azimuth angle of the recorded information. Accordingly, FIG. 2 illustrates a pair of playback heads 22 and 24. The playback head 22 has an azimuth angle of +u, as diagrammatically illustrated, corresponding to the azimuth angle of signals recorded on track 12 and track 16, and other alternating tracks (not shown). Likewise, the playback head 24 has an azimuth angle of −u, corresponding to signals recorded on track 14 and alternating tracks (also not shown).

The invention requires that a playback head may stray from a reference line, such as track centerline 25, a limited amount, without the attenuating of its playback signal. To prevent signal loss when limited track misalignment occurs, the playback head 22 has a track-wise width, X, that is narrow relative to the width, W, of the record tracks. The narrow track-wise width of the head 22 permits limited displacement from track centerline 25, without the playback head 22 extending beyond the borders of its respective record tracks, which would cause signal attenuation.

In preferred embodiments of the invention, both the playback head 22 and the playback head 24 have a track-wise width X which is one-half of the track width W. Thus, both playback heads 22 and 24 may stray from track centerline 25 one-fourth of the width W without appreciably attenuating their playback signals.

Compared to a playback signal achievable with a wider head, the relatively narrow widths of the playback heads results in some loss of playback signal. This is not presumed, however, to unnecessarily limit the tracking capability of the playback apparatus as long as the strength of the recorded signals are sufficiently above playback background noise.

The tracking control apparatus of the invention includes means for producing a tracking control signal that is directly dependent on the position of the playback head 22 relative to the centerline 25 of its associated record tracks. For that purpose, there is provided a tracking control head 26, which has an azimuth angle of +u. The head 26 is mounted for synchronous movement with respect to the playback heads 22 and 24 so as to overlap a given portion of each record track when the playback heads 22 and 24 are aligned with the centerlines 25 of their associated record tracks. Similarly, when the playback heads are misaligned relative to their respective track centerlines 25, the control head 26 overlaps one of the record tracks by a greater amount, and overlaps the adjacent record track by a correspondingly lesser amount. The direction that the playback heads 22 and 24 are misaligned determines which track is overlapped by more of the control head 26 and which track is overlapped by less of the control head.

In a preferred embodiment of the invention, the playback heads 22 and 24 and the tracking control head 26 are mounted on the same headwheel. Other head mounting arrangements, however, are within the scope of the invention such as, for example, the tracking control head 26 may be mounted on a separate headwheel whose motion and location are slewed to that of the playback headwheel.

The tracking control head 26 has a track-wise width, Y, that is wide relative to the track-wise width X of the playback heads. Preferably, the width Y of the control head 26 is equal to the width W of the record tracks.

Accordingly, when the playback heads 22 and 24 are tracking their centerlines accurately and the edges of adjacent tracks coincide, the control head 26 overlaps each track by the amount X, the width of the playback heads.

Although the control head 26 is mounted to overlap adjacent +u and −u record tracks, signal flux from the −u record track is negligible because the output of the head 26 is influenced essentially only by flux from the +u record track. Thus, the amplitude of the tracking control signal is directly proportional to the amount that the head 26 overlaps a +u record track, for a head whose output varies linearly with width.

FIG. 2 also illustrates three tracking alignment conditions relating to the playback of recorded information, and FIG. 3 illustrates the corresponding effect each of these conditions has on the signals produced by the playback heads 22 and 24 and the tracking control head 26. As shown in FIG. 2A, wherein the playback head 22 and the playback head 24 are exactly centered on their respective tracks, the tracking control head 26 is positioned to overlap the tracks 14 and 16 the same amount, which is the track-wise width X of the playback heads 22 and 24. When this condition exists, corresponding FIG. 3A shows that the envelope of the signal from the head 26 is approximately equal to the envelope of the signal from the head 22.

FIGS. 2B and 2C and corresponding FIGS. 3B and 3C illustrate respectively two ways in which mistracking occurs and how corresponding playback head and control track head output signals vary. FIG. 2B illustrates a condition in which the playback heads 22 and 24 stray from a track centerline position toward the left hand edge of their respective record tracks, as viewed in the drawing. A track misalignment in this direction occurs, for example, when the position of the tape 10 is subjected to a transient step advance. When this tracking condition exists, the amplitudes of the signals produced by the playback heads 22 and 24 would not change because the relatively narrow playback heads still overlap their respective record tracks by the same amount as when they were exactly centered on their tracks. However, as shown in FIG. 3B, the amplitude of the signal produced by the tracking control head 26 would increase because of the corresponding increase in the amount that the head 26 overlaps the +u record track 16.

FIG. 2C illustrates the playback heads 22 and 24 when they stray to the opposite side of their respective record tracks. In this condition, there is still no change in the strength of the signals from the playback heads. However, because the tracking control head 26 now overlaps more of the −u record track 14 and less of the +u record track 16, a corresponding decrease in the amplitude of the signal from the head 26 occurs.

Figure 4:
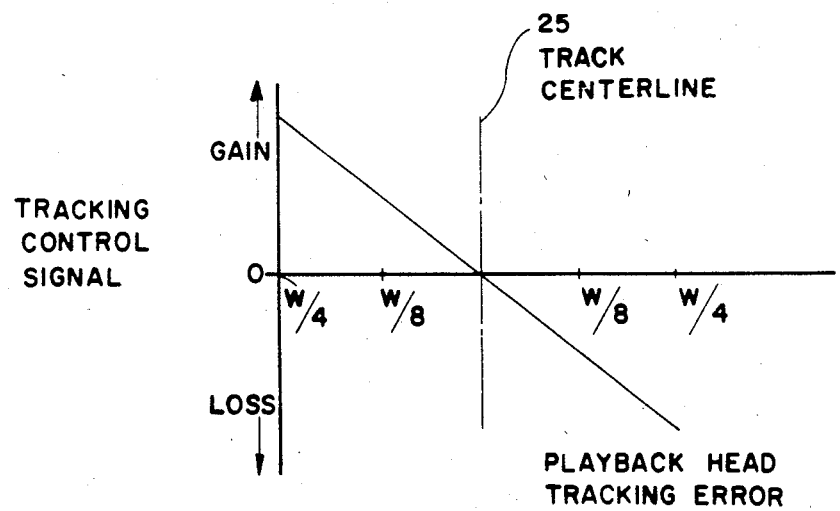
FIG. 4 illustrates variations in tracking control signal amplitude as a function of various playback head tracking conditions.

FIG. 4 illustrates gain and loss in amplitude of the tracking control signal as a function of the direction and the degree to which the playback heads are displaced from track centerline.

Referring now to FIG. 5, there are shown the basic components of magnetic tape transport apparatus for use with tracking control apparatus in accordance with the invention. The magnetic tape 10 is unwound from a reel (not shown) in the direction of the arrow 40. A guide pin 42 guides the tape 10 against the surfaces of two coaxially arranged drum sections 44 and 46. The magnetic tape 10 is passed along a helical path adjacent the surfaces of the drum sections 44 and 46, through an angular range of approximately 180°. The tape 10 then leaves the drum sections 44 and 46, wherein it is driven past a guide pin 47 in the direction of an arrow 54 by a capstan 56, which is connected to a capstan motor 60. Thereafter, the tape 10 is taken up by a reel (not shown) which is similar to the aforementioned supply reel.

The drum sections 44 and 46 are separated to form a circumferential gap 62. A motor 64 drives a headwheel 66, which is mounted at the center of the drums for rotation in an operational plane 67 in alignment with the gap 62. For its power, the motor 64 is connected to the output of a regulated power supply (not shown), which derives its power preferably from line voltage. A head tachometer 72, typically present in slant track record/playback apparatus, is employed so that the motor 64 drives the headwheel 66 at the appropriate speed. In particular, the so-called "once around" tachometer is suitable in this respect because it controls angular head position. Thus, the tachometer 72, upon each revolution of the transducer assembly, produces timing pulses which are compared with a reference signal for regulating the motor 64.

As is shown in FIG. 6, the playback heads 22 and 24 are mounted on the headwheel 66 so that they sweep across the tape at different times. The control track head 26 (also shown in FIG. 5), is mounted on the headwheel 66 midway between the two playback heads. All three heads are mounted on the circumferential edge of the headwheel 66, so that the tip of each head is in contacting relationship with the tape 10 as the headwheel 66 moves each head through 180°, past the tape 10 from one edge to the other. As illustrated in FIG. 6, the playback head 22 starts an operative sweep along the path of a record track, for example track 16, as the playback head 24 is just leaving the preceding track 14. At such time, the control head 26 is halfway across the tape, and thereby lags the head 24 by 90° and leads the head 22 by 90°. Similarly, the control head 26 comes into contact with the tape 10 when the playback head 24 is halfway across the tape, and leaves the tape when the playback head 22 is only halfway across the tape.

To ensure tracking, the tape 10 and the headwheel 66 are driven at appropriate rates. It will be appreciated from the foregoing by those skilled in the art that when the position of the tape 10 is either too advanced or is retarded, the playback heads 22 and 24 stray jointly, in one direction or the other, from desired track centerline positions. The remainder of the tracking control apparatus relates to circuitry for controlling the instantaneous speed of the tape 10 relative to the speed of the headwheel 66 so that the recorded tracks precisely line up with the paths followed by the playback heads 22 and 24 during their operative sweeps across the tape 10.

Figure 7:
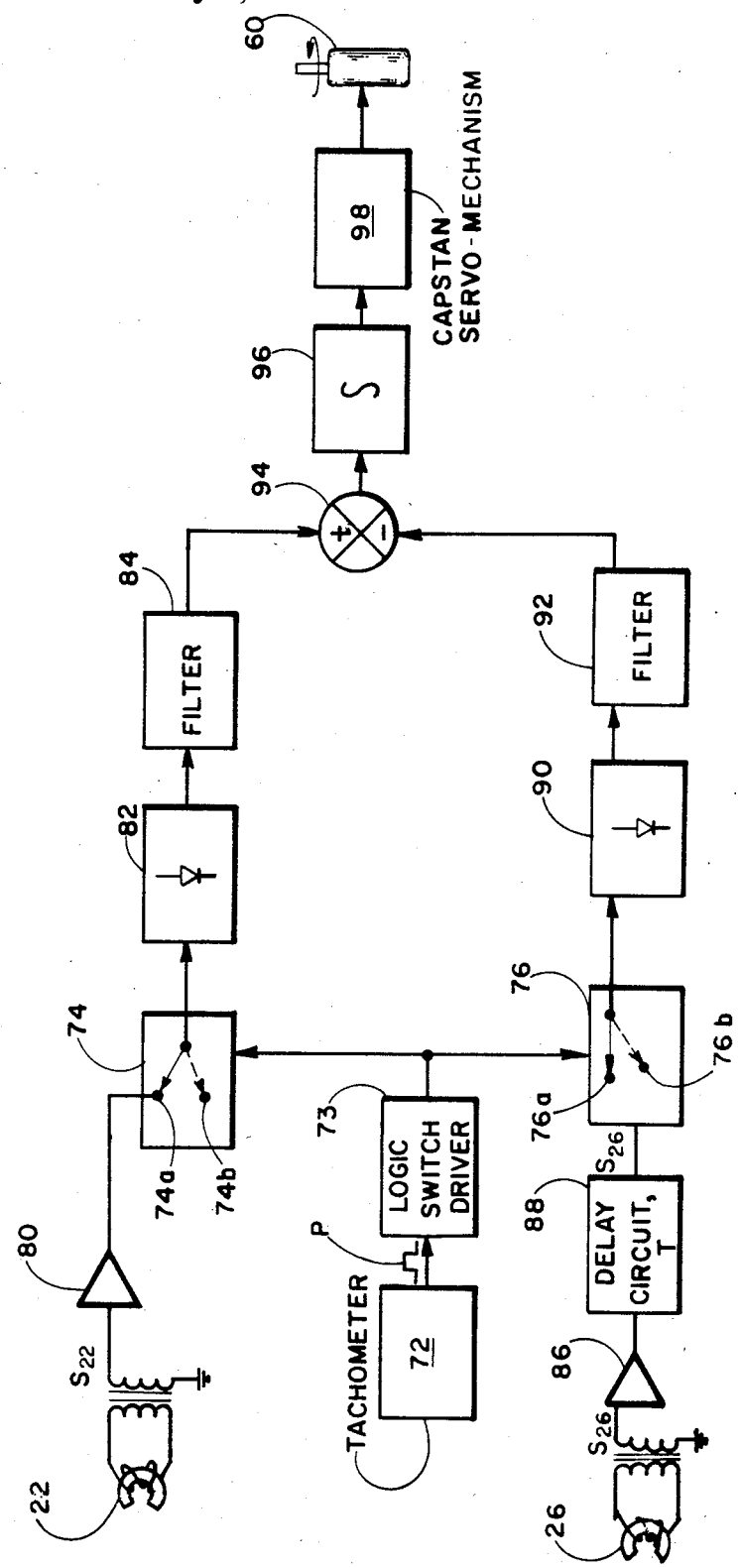
FIG. 7 is a schematic block diagram of a presently preferred embodiment of circuitry for use with tracking control apparatus of the invention.

There is shown in FIG. 7 a block diagram of a preferred embodiment of control circuitry for use with tracking control apparatus of the present invention. In the circuitry of FIG. 7, means are provided for producing a control signal corresponding to when the playback head 22 begins its operative sweep across the tape 10. To this end, the aforementioned head tachometer 72 is used for producing an output timing pulse, P, in synchronism with the head 22 as it begins each pass across the tape 10.

A logic switch driver 73, which is timed by the output pulse P of the head tachometer 72, is arranged to operate a pair of electronic switches 74 and 76 in synchronism with each pass of the playback head 22. In doing so, the driver 73, in response to the output timing pulse of the tachometer 72, causes the switches 74 and 76 to close against their respective contacts 74a and 76a while the head 22 is moving across the tape 10. Similarly, the driver 73 maintains the switches 74 and 76 closed against their contacts 74b and 76b while the head 22 is off the tape 10.

In a rotary transducer apparatus operable, for example, at 1800 revolutions per minute, i.e. a period of 1/30 of a second, the switch driver 73 would accordingly cause the switches 74 and 76 to open and close each 1/60 of a second. Although the switches 74 and 76 are illustrated in the drawings as mechanical in nature, it will of course be clear to those skilled in the art that with the switches being electronic, the switching from one condition to the other condition occurs within a negligible interval.

The switch 74 receives the signal, $S_{22}$, produced by the playback head 22 and amplified by a playback signal amplifier 80. The switch 74, under the control of the switch driver 73, applies its output to rectifier circuitry 82. The purpose of the circuitry 82 is to produce an output that is a duplicate of the positive-going portion of its input $S_{22}$.

A low pass filter 84 receives the output of the rectifier circuitry 82. The purpose of the filter 84 is to provide a moving average of its input. This moving average provides a relatively smooth output of the positive-going portions of the signal $S_{22}$ as applied by the circuitry 82.

Reference is now to the circuit path followed by the signal, $S_{26}$, which is produced by the tracking control head 26. The signal $S_{26}$ is amplified by a signal amplifier 86 and applied to a delay circuit 88. The delay circuit 88 delays the amplified signal $S_{26}$ by an amount, T, and provides an identical but delayed output signal $S_{26}$. The delay T is equal to a time corresponding to the amount the tracking control head 26 leads the playback head 22, and is provided so that the delayed signal $S_{26}$ is contemporaneous with the signal $S_{22}$.

The switch 76, under the control of the switch driver 73, applies its output to rectifier circuitry 90. The purpose of the circuitry 90 is to produce an output that is a duplicate of the positive-going portion of its input $S_{26}$.

A low pass filter 92 receives the output of the rectifier circuitry 90. The filter 92, like the filter 84, produces a moving average of its input, to provide a relatively smooth output of the positive-going portion of the delayed signal $S_{26}$ as applied by the circuitry 90.

The outputs of the filter 84 and the filter 92 are applied respectively to the non-inverting and inverting terminals of a differential amplifier 94. The amplifier 94 functions as a substraction circuit, and thereby produces an output that is proportional to the output of the filter 84 minus the output of the filter 92. Accordingly, the output of the amplifier 94 is proportional to the difference between the positive-going portions of the signals $S_{26}$ and $S_{22}$.

The output of the amplifier 94 is integrated by an integrator 96. The output from the integrator 96 represents an error signal which is proportional to the integral of the difference between the output of the filter 84 and the output of the filter 92. The magnitude of this error signal is proportional to the degree that the playback head 22 is displaced from track centerline 25. The sign of the error signal, i.e. positive or negative, represents the direction of the displacement.

The output of the integrator 96 causes a capstan servomechanism 98 to momentarily vary the nominal speed of the aforementioned capstan drive motor 60.

The servomechanism 98 is arranged to change the speed of the motor 60 in accordance with the magnitude of the error signal. When the error signal is positive, the speed of the motor 60 is momentarily increased and when the error signal is negative, the motor speed is decreased.

In operation, when the tracking control head 26 begins its pass across the tape 10, the switch driver 73, in response to the timing pulse P from the tachometer 72, sets the switches 74 and 76 at their respective contacts 74a and 76a. Thus, the delayed output signal $S_{26}$ from the control head 26 is applied to the switch 76, and the amplified output signal $S_{22}$ from the playback head 22 is applied to the switch 74.

Together the filter 84 and the rectifier circuitry 82 provide a relatively smooth signal, corresponding to a moving average of the positive-going portion of the signal $S_{22}$, to the non-inverting input terminal of the differential amplifier 94. In parallel with that operation, the filter 92 and the circuitry 90 apply a relatively smooth signal corresponding to a moving average of the positive-going portion of the delayed signal $S_{26}$ to the inverting input terminal of the circuit 94.

When the playback head 22 is aligned with a track centerline 25 of a +u record track, the tracking control head 26 overlaps that record track by an amount which is equal to the track width X of the playback head 22. In that condition, the amplitude of the delayed signal $S_{26}$ is approximately equal to the amplitude of the corresponding portion of $S_{22}$. The input to the integrator 96 is therefore approximately zero volts, so that the error signal applied by capstan servomechanism 98 to the capstan drive motor 60 is negligible. Thus no adjustment to the speed of the tape 10 occurs.

When the playback head 22 strays to the left of track centerline 25, as viewed in FIG. 2B, the head 26 overlaps the +u record track to a greater degree, in accordance with the tracking error of the head 22. This tracking condition causes the amplitude of the tracking control signal $S_{26}$ to increase in accordance with the amount that the playback head 22 has strayed to the left. Accordingly, the input to the inverting terminal of the substraction circuit 94 is greater than the input to the non-inverting terminal. The integrator 96 produces a negative-going error signal, which indicates that tape is too advanced. The amplitude of the error signal is proportional to the distance that the head 22 has strayed from centerline 25, and thereby is related to the advanced position of the tape. The servomechanism 98, in response to a negative-going error signal, causes the capstan drive motor 60 to momentarily decrease the speed of the tape 10, to allow the playback head 22 to return to track the centerline 25.

A similar situation, but opposite in result, occurs when the playback head 22 strays to the right of track centerline 25, as shown in FIG. 2C. For this tracking condition, the tracking control head 26 overlaps the −u record track to a greater degree, and, of course, the +u record track to a lesser degree. Accordingly, the amplitude of $S_{26}$ is reduced, and the input to the inverting terminal of the substraction circuit 94 is less than the input to its non-inverting terminal. The amplitude of the error signal produced by the integrator 96 is again proportional to the tracking error, although this time the sign of the error signal is positive to indicate that the tracking error is in the opposite direction. A positive error signal causes the servomechanism 98 to temporarily increase the speed of the tape 10, to return the playback head 22 to track the centerline.

From the foregoing description, it will be apparent to those skilled in the art that a second tracking control head may be used for extending tracking control to the operative sweeps of playback head 24. For that purpose, the second tracking control head, which would have an azimuth angle of −u, may be conveniently located on the headwheel 66 diametrically opposite the tracking control head 26.

On the other hand, if an average of the positive-going portion of the signals recorded on a −u record track is approximately equal to an average of the positive-going portion of the signals recorded on the adjacent +u record track, the signal $S_{24}$ may be processed in association with the signal $S_{26}$, without the addition of a second tracking control head. Because the playback signal $S_{24}$ and the tracking control signal $S_{26}$ are from different record tracks, there is no need to delay $S_{24}$ for coincidence with $S_{26}$. That is, the playback signal from the last half of the sweep of the head 24 may be compared to the tracking control signal produced during the first half of the corresponding sweep of the head 26.

When tracking is based on an approximate equality of the averages of signals from one track to the next, there are provided certain other advantages associated with the design of the signal processing circuitry. For example, unlike the circuitry of FIG. 7, the signal from the last half of the sweep of the control head 26 may be compared to the playback signal from the first half of the sweep of the head 22.

Figure 8:
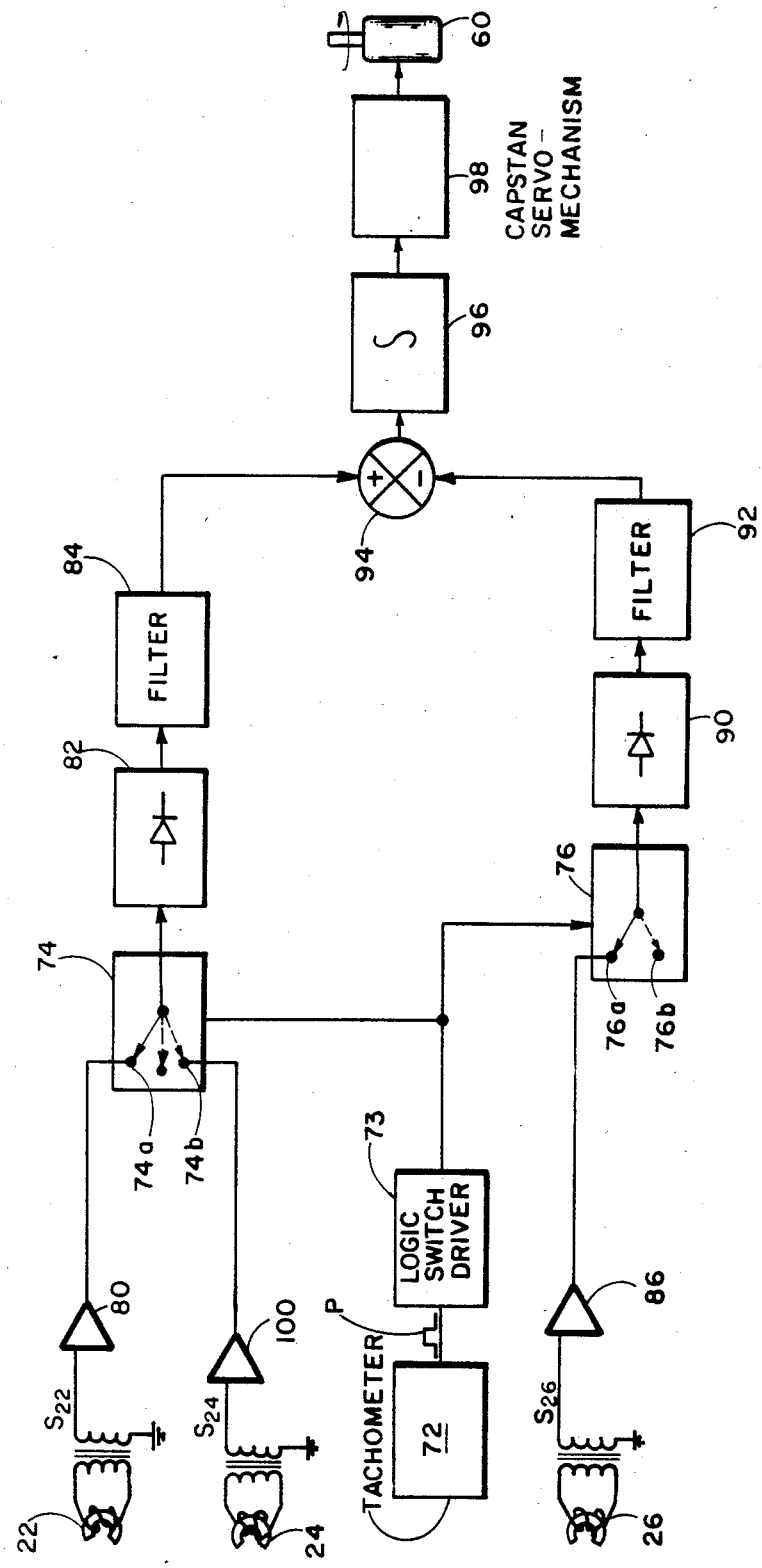
FIG. 8 is a schematic block diagram of an alternate preferred embodiment of circuitry for use with the invention.

FIG. 8 shows signal processing circuitry which is based on a presumption that the average strength of the signals recorded on one track is equal to the average strength of the signals recorded on the adjacent track. Circuitry of FIG. 8 which is common or substantially similar to circuitry of FIG. 7 is identified by like numerals.

In the circuitry of FIG. 8, the signal $S_{24}$ is amplified by a signal amplifier 100 and applied to the contact 74b of the switch 74. Based on the presumption underlying the design of the circuitry of FIG. 8, there is no need to delay $S_{26}$ for coincidence with $S_{22}$. Therefore, the signal $S_{26}$, as amplified by the amplifier 86, is applied directly to the contact 76a of the switch 76.

In the circuitry of FIG. 8, the switch 74 has two active positions, and a third, neutral position. The aforementioned logic switch driver 73, which is timed by an output pulse of the head tachometer 72, causes the switch 74 to close against its contact 74a during the first half of the sweep of the playback head 22 across the tape 10, when the control head 26 also contacts the tape. Similarly, the driver 73 maintains the switch 74 closed against its contact 74b during the last half of the sweep of the playback head 24 across the tape 10, which is also when the head 26 contacts the tape. Additionally, the driver 73 maintains the switch 74 in its neutral position, while the head 26 is off the tape 10.

The logic switch driver 73 causes the switch 76 to close against its contact 76a while the head 26 is moving across the tape, and to close against contact 76b while the head 26 is off the tape.

The neutral contact of the switch 74 and the contact 76b of the switch 76 are provided to de-couple all of the heads from the output of the processing circuitry thereby disabling the signal processing circuitry during the time the tracking control head 26 is off the tape 10.

The circuitry of FIG. 8, in response to the playback signals $S_{22}$ and $S_{24}$ and the tracking control signal $S_{26}$, otherwise operates identically to the circuitry of FIG. 7. Accordingly, by means of a single tracking control head 26, tracking, under the control of the driver 73, is achieved for 180° of each scanning period, during the first half of an operative sweep of the playback head 22 and during the final half of the operative sweep of the playback head 24.

The tracking control apparatus, according to the invention, has general application to azimuth recording of information on a magnetic storage device having closely spaced parallel record tracks. Accordingly, the invention may be used for direct access to information recorded on magnetic disk, as well as sequential access to information recorded on magnetic tape.

Additionally, the invention is applicable to playback of any of a variety of signals, known or otherwise. Accordingly, the tracking control apparatus is not limited to the tracking of signals, a component of which must be known, as is the case with the prior art disclosed hereinbefore.

The invention offers certain other advantages. For example, because the tracking control head has an azimuth angle corresponding to the azimuth angle of alternating record tracks, the control head may also serve as a record head when the apparatus used for playback is the same apparatus used for recording. Additionally, the circuitry for use with the invention offers advantages from the standpoint of simplicity of design, low cost, etc. This is because the invention obviates the need for phase-locked loops and phase detectors and other expensive and complicated circuitry, commonly found in tracking control apparatus.

The invention has been disclosed in detail with reference to preferred embodiments thereof, but it will be understood that variations and modifications can be effected within the spirit and scope of the invention.

What is claimed is:

1. In apparatus for playback of information recorded on a magnetic storage device, said apparatus having servomechanism means, responsive to a tracking error signal, for aligning a playback head with respect to alternating record tracks of the storage device having information recorded at an azimuth angle which corresponds to the azimuth angle of said playback head but which is different from the azimuth angle of information recorded on the adjacent record tracks, the improvement comprising:
  (a) said playback head having a track-wise width that is less than the width of its associated record track, to prevent the attenuating of its playback signal as the result of limited misalignment of said playback head relative to a reference line of its associated record track;
  (b) a tracking control head mounted in fixed spatial relationship with respect to said playback head wherein said tracking control head (1) overlaps the record track associated with said playback head a predetermined amount when said playback head is aligned with respect to the reference line of its associated record track, and (2) overlaps the track associated with said playback head a variable amount in accordance with the magnitude and the direction of misalignment of said playback head with respect to the reference line of its associated record track, said control head having an azimuth angle corresponding to said playback head, whereby said control head produces a tracking control signal having an amplitude which is proportional to the amount which said control head overlaps the record track associated with said playback head; and (c) comparator means for producing the aforementioned tracking error signal in accordance with the difference between the amplitude of the tracking control signal and the amplitude of the playback signal of said playback head.

2. Magnetic playback apparatus as defined in claim 1 wherein said comparator means includes circuit delay means for causing the tracking control signal to coincide with the playback signal.

3. Magnetic playback apparatus as defined in claim 2 wherein said circuit delay means operates to delay the tracking control signal so that the control signal is contemporaneous with the playback signal.

4. In a magnetic tape playback apparatus having servomechanism means, responsive to a tracking error signal, for aligning the operative sweeps of a pair of playback heads with respect to alternating tape record tracks having information recorded at azimuth angles which correspond respectively to mutually different azimuth angles of said playback heads, the improvement comprising:

(a) said playback heads having a narrow track-wise width that is less than the width of their associated record tracks, to prevent the attenuating of their playback signals as the result of limited misalignment of the operative sweeps of said playback heads relative to a reference line of their record tracks;

(b) a tracking control head mounted for movement in fixed spatial relationship with respect to the operative sweeps of said playback heads wherein said tracking control head (1) overlaps the record tracks associated with both playback heads a predetermined amount when the operative sweeps of said playback heads are aligned with respect to the reference line of their associated record tracks, and (2) overlaps the record track associated with one of said playback heads by a greater amount and overlaps the adjacent record track associated with the other of said playback heads by a correspondingly smaller amount, in accordance with the amount and the direction of misalignment of the operative sweeps of said playback heads with respect to the reference line of their associated record tracks, said control head having an azimuth angle corresponding to one of said playback heads, whereby said control head produces a tracking control signal having an amplitude which is proportional to the amount which said control head overlaps the record track associated with said last-mentioned playback head; and (c) comparator means for producing the aforementioned tracking error signal in accordance with the difference between the amplitude of the tracking control signal and the amplitude of a playback signal of either of said playback heads.

5. Magnetic tape playback apparatus as defined in claim 4 wherein said tracking control head has a track-wise width that is wide relative to the track-wise width of said playback heads.

6. Magnetic tape playback apparatus as defined in claim 5 wherein said tracking control head has a track-wise width corresponding to the width of a record track.

7. Magnetic tape playback apparatus as defined in claim 6 wherein said tracking control head also serves as a magnetic record head for the recording of information at an azimuth angle corresponding to the azimuth angle of one of said playback heads.

8. Magnetic tape playback apparatus as defined in claim 4 wherein said servomechanism means controls a tape capstan motor for regulating tape transport speed.

9. Magnetic tape playback apparatus as defined in claim 4 wherein said comparator means produces the tracking error signal in accordance with the difference between the amplitude of the tracking control signal and the amplitude of the playback signal produced by the playback head having an azimuth angle corresponding to said control head.

* * * * *